Figure 1:
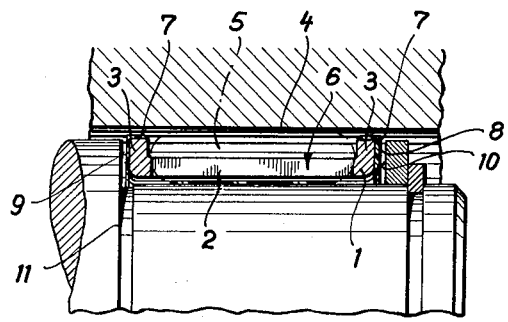

April 3, 1962 G. SCHAEFFLER 3,028,204
CAGE FOR NEEDLE BEARINGS
Filed Oct. 20, 1958 2 Sheets-Sheet 1

April 3, 1962

G. SCHAEFFLER 3,028,204

CAGE FOR NEEDLE BEARINGS

Filed Oct. 20, 1958

2 Sheets-Sheet 2

INVENTOR.
Georg Schaeffler
BY
Mawkinney & Mawkinney
ATTORNEYS

United States Patent Office 3,028,204
Patented Apr. 3, 1962

3,028,204
CAGE FOR NEEDLE BEARINGS
Georg Schaeffler, Herzogenaurach, near Nuremberg, Germany, assignor to Industriewerk-Schaeffler oHG., Herzogenaurach, near Nuremberg, Germany, a German company
Filed Oct. 20, 1958, Ser. No. 768,153
Claims priority, application Germany Oct. 22, 1957
2 Claims. (Cl. 308—217)

This invention relates to cages for bearing needles.

Cages for bearing needles of small diameter and relatively great length have been developed in various constructional forms, as the advances made in recent years indicate. The slight wall thicknesses, the slight bar thickness in order to allow a large number of needles to be accommodated, and the number of windows themselves require for the production of such cages other considerations and methods than are conventional in the production of cages for roller elements of larger diameter.

Hitherto, as compared with the use of metal cages, cages made of synethetic plastic material have only been used on a limited scale for bearing needles. The good properties of a plastic cage, namely shock absorption, reduced friction and no or little detrimental abrasion, are well known. But these are counterbalanced by poor rigidity and relatively high sensitivity to temperature changes, poor heat conductivity and poor ability to maintain specified dimensions, due to the shrinkage and swelling normal with most plastics, additionally to the very different co-efficient of thermal expansion from that of the metals. Furthermore, the production of plastic cages entails considerable tool costs, owing to the large number of windows required.

In cages made of metal, which are produced preferably from drawn material, the slight wall thickness permits the windows to be produced in a particularly economical manner by punching. The improvement of the surface of the window bars by reaming or sizing, on the other hand, is difficult and time-wasting. The long bars owing to their elasticity are a source of considerable inaccuracy, more particularly with reaming and sizing. Rough surfaces or inaccurate surfaces have a detrimental effect on the operation of the cage. Rough bar surfaces, against which the needles abut, produce abrasion. Inaccurate bar surfaces lead to axial thrust and axial abutment of the cage end surfaces against the axial boundary surfaces of the machine part or of the bearing, with considerable surface pressure. For various reasons, the metals to be used cannot be selected in accordance with optimum sliding properties, but have usually to be chosen for other properties such as strength and economical manufacture.

It is known in antifriction bearings to provide the raceways of the races or rolling elements themselves with a covering of rubber or synthetic plastic material in order to reduced noise, friction and wear or to achieve good running-in behaviour.

It is also known in antifriction bearings to provide the sliding surfaces with such a covering for the same reasons.

Finally, a roller bearing is also known wherein a cage core made of metal is enclosed in a detachable plastic frame. In this way, the advantageous sliding properties of plastics are to be used for guiding the rolling elements, while at the same time maintaining the stability of the cage by the use of metal parts. The use of the known plastic frames is in practice not possible for cages for needle bearings owing to the low height available. The walls of the plastic cages must have a certain minimum thickness more particularly between the metal core and the rolling elements, for manufacturing reasons. This results in a considerable spacing of the individual rolling elements, which cannot be tolerated for needle bearings owing to the consequent reduction in load-supporting capacity.

Finally, a ball cage consisting of two rings is also known wherein the rings are rivted together after the balls have been inserted in the pockets. The inner surfaces of the two cage halves are covered with a plastic layer. When the cage halves are riveted together after the balls are inserted in the pockets there is unavoidably an irregular compression of the plastic coverings at the inner sides of the cage halves depending on the extent to which the two cage halves are riveted together. This results in providing a varying amount of play for the balls and in some cases can even result in jamming the balls in the cage pockets.

The invention proceeds from a cage for bearing needles wherein a metal core body is surrounded with a plastic jacket.

According to the invention, it is proposed to provide the metal core body on all sides with a uniform, thin, elastic covering of plastic, preferably polyamide, which is produced by a dipping or spraying process, in such a manner that the cage needles are retained in the cage windows either exclusively by the thin plastic covering or, if the cage core is provided in a manner known per se with retaining projections for the needles, exclusively by the plastic covering surrounding the retaining projections.

An object of the present invention is on the one hand to obviate the poor sliding properties of the metal cages without having to select for the purpose metals with the best sliding properties and without having to carry out time-wasting and still unsatisfactory surface treatment, and on the other hand, practically to eliminate the disadvantageous properties of plastics, such as poor ability to maintain desired dimensions, low strength and poor heat conductivity.

According to the present invention, there is provided a cage for bearing needles, said cage comprising a body made of metal, which body includes a plurality of axial circumferentially spaced bars defining windows for receiving bearing needles, a cover of plastic material being provided over at least those surfaces of the bars engageable with the needles.

The thin, adhering plastic cover can also, if the manufacturing process permits, be restricted only to the cage surfaces which slide radially or axially or guide the bearing needles. Also, the cross-section of the metal cage core should be made as large as possible. The covering of plastic material surface completely eliminates the disadvantageous effect of leaving the cage metal with rough sliding surfaces.

It is even advantageous for the cage core to be left with rough surfaces in the form in which it first emerges from manufacture. Rough metal surfaces on the cage core have in fact the advantage, as regards the thin plastic material cover, that fine recesses are formed beside abutment surface zones and a supply of lubricant can be provided in the recesses.

The plastic material cover and the recesses existing owing to the roughness of the basic material afford particular advantages at the end faces of the cages, which abut axially like axial discs. As is known, owing to the difficulty of forming a hydrodynamic lubricating condition, it is even more important to have a supply of lubricant at axial abutment discs than at radially abutting surfaces.

In metal cages, the slightly oblique positions which roller elements unavoidably take up in the windows at high rotational speeds result in shock-like stressing of the bar surfaces. With such material, this leads to deformation of the bar surfaces, and it is on the accurately established, axially parallel position of these surfaces that the properties of the cage depend to a considerable extent. With hard materials, their consequentially low elasticity can lead to subjecting the bars to high loads, particularly at the ends of the bars, and can lead to fracture of the said bars. The elastic cover made of plastic material can elastically absorb these movements of the needles under load, and in the zone relieved of load, brings about an accurate axially parallel alignment owing to its resilience.

With any manufacturing process involving cutting, but also in the case of non-cutting manufacturing processes, surface particles of metal are left incompletely bonded to the basic metal and these particles can become detached during operation. The plastic material cover is capable of covering and retaining such metal particles. This is a further reason why it is advantageous for the entire cage to be covered with a uniform thin plastic material layer. The aforesaid, only partly bonded metal particles, e.g. flakes caused by punching are also particularly dangerous since aggressive media can penetrate into the gaps and break off the flakes by splitting corrosion of the surface.

The punching technique used for metal needle cages is also used for so-called massive windowed cages, i.e. for cages whose wall thickness is only slightly less than the diameter of the roller elements. In such cages, the windows are wider than the needle diameter. The bar surfaces guiding the needles are parallel. Now, as is known, it is particularly difficult to support the needles in such windows. Various methods are known for forming-on retaining means, but these result in embrittlement of the pre-formed parts of the material, particularly so if the material is formed out of the bars. The projections serving as retaining means and extending into the cage windows are generally additionally stressed during insertion of the needles into the windows and there is a risk that in this case the projections may be broken off and pass into the bearing as metal particles.

In order to avoid this disadvantage, according to a more limited feature of the invention it is proposed for the cage needles to be supported in the cage windows exclusively by the elastic plastic material cover.

If the cage core is provided in a manner known per se with retaining projections for the bearing needles, these retaining projections are provided with the thin, uniform, securely adhering plastic material cover. The metal projections of the cage core are made so small that their spacing is greater than the needle diameter, so that the effective retaining projection is only formed when the plastic covering is in position. As a result, when the needles are inserted into the windows there is the advantage that the metal projections are not disturbed and only the plastic material is elastically deformed.

Of course, it is also possible for the metal cage core to be made without retaining projections and for the retaining projections to be formed out of the bar surfaces after the plastic covering has been applied. Known means can be used for this purpose. For example, the tools for shaping the plastic can be heated.

Since, with a view to giving strength to the cage, it is desirable to have a particularly thin and uniform plastic material layer whilst on the other hand relatively considerable deformation has to be absorbed at the retaining projections when the needles are deflected into the windows, the plastic material has to have good elongation and considerable strength. The sliding load on the material also requires that there be little friction and good resistance to abrasion. It has been found that a plastic material cover consisting of polyamide is particularly to be recommended for satisfying all these requirements.

It has already been pointed out that it is expedient for the cage core to be left with rough surfaces in the form in which it emerges first from manufacture. A substantial improvement in shape-retaining properties is obtained if the cage core is roughened and consolidated at its surface by per se known blasting means.

The novel inventive idea can be applied to cages for needle bearings wherein the core body consists of metal either with or without retaining projections. In the former case, the inventive idea is applicable to sheet metal cages which are situated either inside or outside the pitch circle of the needles. In such cages, the needles are retained exclusively by the thin plastic covering, and the spacing of the neighboring core body part is greater than the needle diameter. Only by this construction of cage is it possible to arrange the cage inside or outside the needle pitch circle, since only in this way can the necessary radial bar thickness be obtained for the cage. It is also possible in such cages to spring the needles in through the cage windows.

The novel cage is particularly important when the metal core body, without retaining projections, extends in the radial direction towards both sides of the needle pitch circle. In this case, the plastic covering applied to the metal core body e.g. by means of heated tools, is so deformed that at the upper and lower ends of the side surfaces of the cage bars retaining projections are formed exclusively by the thin plastic covering.

For a better understanding of the invention and to show how the same may be carried into effect reference will now be made to the accompanying drawings, in which—

Figure 2:
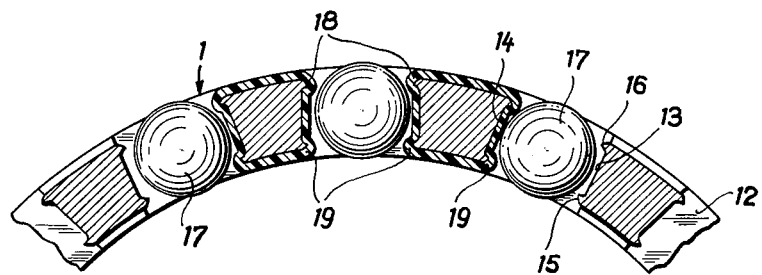
Figure 3:
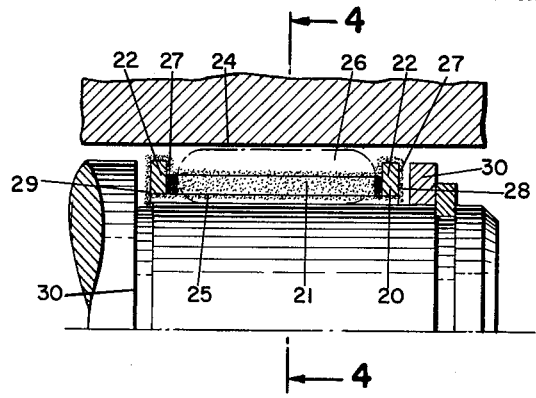

FIGURE 1 is a longitudinal, partly sectional view of a needle bearing incorporating a sheet metal cage according to one embodiment of the invention, FIGURE 2 is a cross-section through the windows of part of a cage according to another embodiment of the invention, FIG. 3 shows a longitudinal sectional view of a sheet metal case with a uniform, thin, elastic covering made of synthetic plastic material all around.

Figure 4:
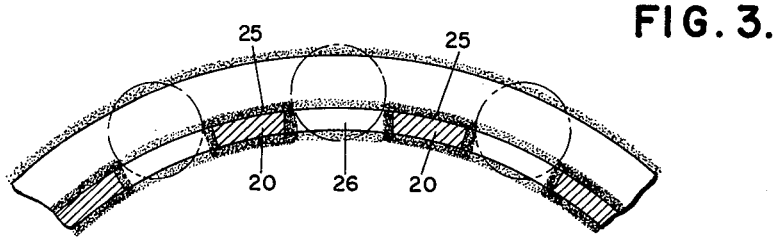
Figure 5:
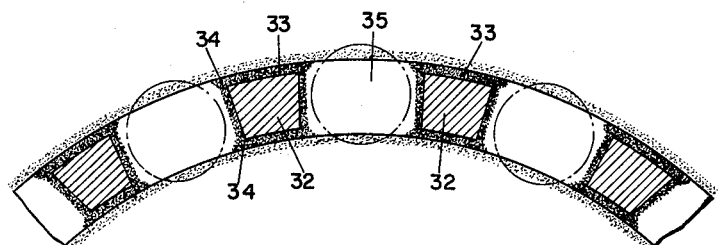
Figure 6:
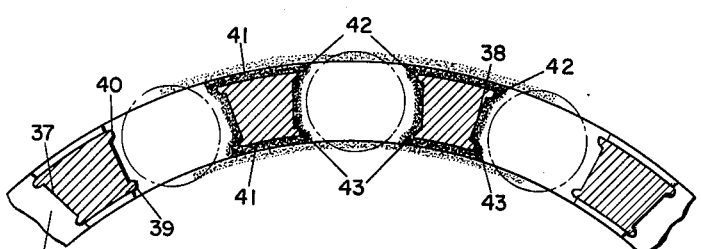

FIG. 4 shows the cage according to FIG. 3 in section on the line 4—4 of FIG. 3 on a larger scale, FIG. 5 shows a cross-section through cage windows without retaining projections, with a thin, elastic covering of synthetic plastic material, of part of a massive windowed cage, and FIG. 6 shows a cross-section through cage windows with retaining projections with and without a plastic covering, of part of a massive windowed cage and showing an elastic covering all around.

The cage 1 according to FIGURE 1 can be regarded as the basic form of the so-called sheet metal cage. It is formed, for example, without cutting, in the form of a cylinder 2 having two lateral rims 3. The cylinder lies within the pitch circle of the bearing, but according to a form of embodiment not shown in the drawings can also lie outside the pitch circle of the bearing near the outer raceway 4 and may have inwardly directed rims. The abutment surfaces of the needles 5 in the punched windows 6 and also the outer peripheral rim surfaces 7, which serve for centering the bearing in the radial sense in the raceway 4, and the end-face abutment surfaces 8 and 9 which abut against the axial boundary surfaces 10 and 11, are covered with plastic material.

FIGURE 2 is a partial view, in cross-section, of the basic form of a so-called massive windowed cage. Despite the relatively thick bars, the stability of the cage is still comparatively slight owing to the length of the bars. Starting from a tube whose wall is only slightly less in size than the diameter of the needles the cage is provided with windows 12, e.g. by punching. The at first parallel walls 13 and 14 of a window are provided near the inner and outer peripheries of the cage with projections 15 and 16 in order to retain the needles 17 in the windows. In metal cages not having a cover, the spacing between the pre-formed projections is less than the diameter of the needles. Therefore, when, after the projections have been formed-on, the said needles are inserted in the windows, the needles have to push back the metal projections elastically and plastically to some extent. The stressing which occurs is detrimental both to the projections and to the needles. If plastic covers are used, the spacing between the metal projections 15 and 16 is kept larger than the diameter of the needles, and when the needles are inserted in the cage more particularly only the plastic layer 18 and 19 is deformed, elastically and to some extent plastically. The resilience of the plastic is substantially greater than that of metals and therefore better support of the needles is provided, even if the latter have to be taken out of the windows several times.

The cage 20 according to FIGS. 3 and 4 can be regarded as a basic form of the so-called sheet metal cage. It is formed, for example, without cutting, in the form of a cylinder 21 having two lateral rims 22. The cylinder lies within the pitch circle of the bearing, but according to a form of embodiment not shown in the drawings can also lie outside the pitch circle of the bearing near the outer raceway 24 and may have inwardly directed rims.

The cage core 20 with the lateral rims 22 is provided on all sides with a uniform, thin elastic covering 25 made of synthetic plastic material. In this construction of cage, therefore, the abutment surfaces of the needles 26 in the punched cage windows and the outer peripheral rim surfaces 27, which serve for radial centering in the raceway 24, and the end-face abutment surfaces 28 and 29 which abut against the axial boundary surfaces 30 and 31, are all covered with a thin plastic layer.

As FIG. 4 shows, the spacing of neighboring cage cores 20 is greater than the diameter of the needles 26, so that the needles 26 are retained in the radial inward direction exclusively by the thin plastic covering 25. With this cage construction, the needles 26 can also be inserted elastically from within in the radial direction.

In the constructional form according to FIG. 5, wherein a massive windowed cage is shown partly in cross-section, the cage cores 32 are also without any retaining projections. The cage cores 32 extend in the radial direction both inwardly and outwardly of the pitch circle of the needles.

The cage core 32 which has first of all been provided with a uniform, thin plastic material covering 33 made by a dipping or spraying process is then subsequently so deformed by heated tools that retaining projections 34 for the needles 35 are formed at the upper and lower ends of the bar side surfaces. In this case also, the needles are retained exclusively by the retaining projections 34 which are formed of the thin elastic plastic covering.

FIG. 6 also shows a partial view of the basic form of a massive windowed cage, in cross-section. Starting from a tube whose wall is only slightly less in size than the diameter of the needles, the cage is provided with windows 36, e.g. by punching. The at first parallel walls 37 and 38 of a window are provided near the inner and outer peripheries of the cage with projections 39 and 40. The spacing of the pre-shaped retaining projections 39 and 40 is greater than the diameter of the needles. The cage described hereinbefore is provided on all sides by a dipping or spraying process, with a uniform, thin, elastic covering 41 of synthetic plastic material which also surrounds the metal retaining projections 39 and 40 to a uniform thickness. In this way there are produced retaining projections 42 and 43, the spacing of the retaining projections 42 and 43 from one another being smaller than the diameter of the needles. With this form of embodiment also, the needles are retained in the radial direction exclusively by the retaining projections 42 and 43 which consist of elastic plastic material.

I claim:

1. A cage for bearing needles, said cage comprising a cylindrical metal body having roughened surfaces extending all over said body, said body including two axially spaced end rings, a plurality of circumferentially spaced bars extending axially from one of said end rings to the other of said end rings and connected thereto, said bars defining therebetween a plurality of elongated windows having substantially parallel longitudinal walls provided by said bars, and opposite projections directed into each space along the radially inner and outer longitudinal edges of the walls of said space, said opposite projections of said space having a peripheral spacing slightly greater than the diameter of said needles; a film of resiliently deformable plastic material of uniform thickness bonded to and covering all of said roughened surfaces in conformity therewith to define lubricant receiving cavities in the exposed surfaces of said film, said film having a thickness slightly greater than the difference between the radius of said needles and half of said peripheral spacing; and a plurality of bearing needles removably located one in each of said spaces and held in said spaces solely by the portions of said film covering said projections.

2. A cage for bearing needles according to claim 1 wherein the plastic material is polyamide.

References Cited in the file of this patent
UNITED STATES PATENTS

| | | |
|---|---|---|
| 2,712,481 | Martin | July 5, 1955 |
| 2,772,128 | Schaeffler et al. | Nov. 27, 1956 |

FOREIGN PATENTS

| | | |
|---|---|---|
| 1,007,570 | Germany | May 2, 1957 |